(12) United States Patent
Seelam et al.

(10) Patent No.: US 10,893,120 B2
(45) Date of Patent: Jan. 12, 2021

(54) DATA CACHING AND DATA-AWARE PLACEMENT TO ACCELERATE MACHINE LEARNING APPLICATIONS

(71) Applicant: INTERNATIONAL BUSINESS MACHINES CORPORATION, Armonk, NY (US)

(72) Inventors: Seetharami R. Seelam, Chappaqua, NY (US); Andrea Reale, Dublin (IE); Christian Pinto, Dublin (IE); Yiannis Gkoufas, East Wall (IE); Kostas Katrinis, Dublin (IE); Steven N. Eliuk, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/136,086

(22) Filed: Sep. 19, 2018

(65) Prior Publication Data

US 2020/0092392 A1    Mar. 19, 2020

(51) Int. Cl.
G06F 15/167 (2006.01)
H04L 29/08 (2006.01)
G06F 12/084 (2016.01)
G06N 20/00 (2019.01)
G06F 16/17 (2019.01)

(52) U.S. Cl.
CPC ........ *H04L 67/2852* (2013.01); *G06F 12/084* (2013.01); *G06F 16/17* (2019.01); *G06N 20/00* (2019.01); *H04L 67/1097* (2013.01)

(58) Field of Classification Search
CPC ............ G06F 12/0815; G06F 12/0862; G06F 12/0868; G06F 16/172; G06F 16/182
See application file for complete search history.

(56) References Cited

U.S. PATENT DOCUMENTS

| 6,298,428 B1 | 10/2001 | Munroe et al. |
| 7,809,882 B1 | 10/2010 | Liu et al. |
| 8,799,403 B2 | 8/2014 | Chan |
| 10,007,609 B2 | 6/2018 | Dube |
| 2010/0094945 A1 | 4/2010 | Chan et al. |
| 2013/0110961 A1 | 5/2013 | Jadhav |

(Continued)

FOREIGN PATENT DOCUMENTS

GB    2519534 A    10/2013

OTHER PUBLICATIONS

Aji, Ashwin, et al., Jun. 2012, MPI-ACC: An Integrated and Extensible Approach to Data Movement in Accelerator-based Systems. Conference: The 14th IEEE International Conference on High Performance Computing and Communications.*

(Continued)

*Primary Examiner* — Brian Whipple
*Assistant Examiner* — Gregory P Tolchinsky
(74) *Attorney, Agent, or Firm* — Griffiths & Seaton PLLC

(57) ABSTRACT

Embodiments for data caching and data-aware placement for machine learning by a processor. Data may be cached in a distributed data store to one or more local compute nodes of cluster of nodes with the cached data. A new job may be scheduled, according to cache and data locality awareness, on the one or more local compute nodes with the cached data needed for execution.

18 Claims, 8 Drawing Sheets

(56) References Cited

U.S. PATENT DOCUMENTS

| | | | |
|---|---|---|---|
| 2013/0132967 A1* | 5/2013 | Soundararajan | G06F 9/5066 |
| | | | 718/104 |
| 2016/0179669 A1 | 6/2016 | Dube et al. | |
| 2017/0270435 A1* | 9/2017 | Gallardo | G06N 3/08 |
| 2017/0351889 A1* | 12/2017 | Govindarajan | G06F 8/65 |
| 2017/0353396 A1* | 12/2017 | Burke | G06F 9/4881 |
| 2018/0083944 A1* | 3/2018 | Vats | H04L 63/08 |
| 2019/0121889 A1* | 4/2019 | Gold | G06F 16/2255 |
| 2019/0146916 A1* | 5/2019 | Matsakis | G06F 12/084 |

OTHER PUBLICATIONS

"Implementing a Caching Service for Distributed CORBA Objects" J. Sventek and G. Coulson (Eds.): Middleware 2000, LNCS 1795, pp. 1-23, 2000.

"CoCache: Multi-layer Multi-path Cooperative Cache Accelerating the Deployment of Large Scale Virtual Machines" Ziyang Li, Zhaoning Zhang, Huiba Li, Yuxing Peng National Key Laboratory for Parallel and Distributed Processing National University of Defense Technology, China 2014 IEEE 8th International Symposium on Service Oriented System Engineering.

"Content Look-Aside Buffer for Redundancy-Free Virtual Disk I/O and Caching" Chun Yang, Xianhua Liu, Xu Cheng Peking University yangchun,liuxianhua,chengxu @mprc.pku.edu.cn pp. 214-227.

* cited by examiner

DATA CACHING AND DATA-AWARE PLACEMENT TO ACCELERATE MACHINE LEARNING APPLICATIONS

BACKGROUND OF THE INVENTION

Field of the Invention

The present invention relates in general to computing systems, and more particularly to, various embodiments for data caching and data-aware placement for acceleration of machine learning applications by a processor.

Description of the Related Art

In today's society, consumers, businesspersons, educators, and others communicate over a wide variety of mediums in real time, across great distances, and many times without boundaries or borders. With the increased usage of computing networks, such as the Internet, humans are currently inundated and overwhelmed with the amount of information available to them from various structured and unstructured sources. Due to the recent advancement of information technology and the growing popularity of the Internet, a wide variety of computer systems have been used in machine learning. Machine learning is a form of artificial intelligence that is employed to allow computers to evolve behaviors based on empirical data.

SUMMARY OF THE INVENTION

Various embodiments for caching and data-aware placement for acceleration of machine learning applications by a processor, are provided. In one embodiment, by way of example only, a method for caching and data-aware placement for acceleration of machine learning applications in a multi-tenant computing environment, again by a processor, is provided. Data may be cached in a distributed data store to one or more local compute nodes of a cluster of nodes. The life cycle of the cached data may be decoupled from a life cycle of a job. A new job may be scheduled, according to cache and data locality awareness, on the one or more local compute nodes with the cached data needed for execution.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
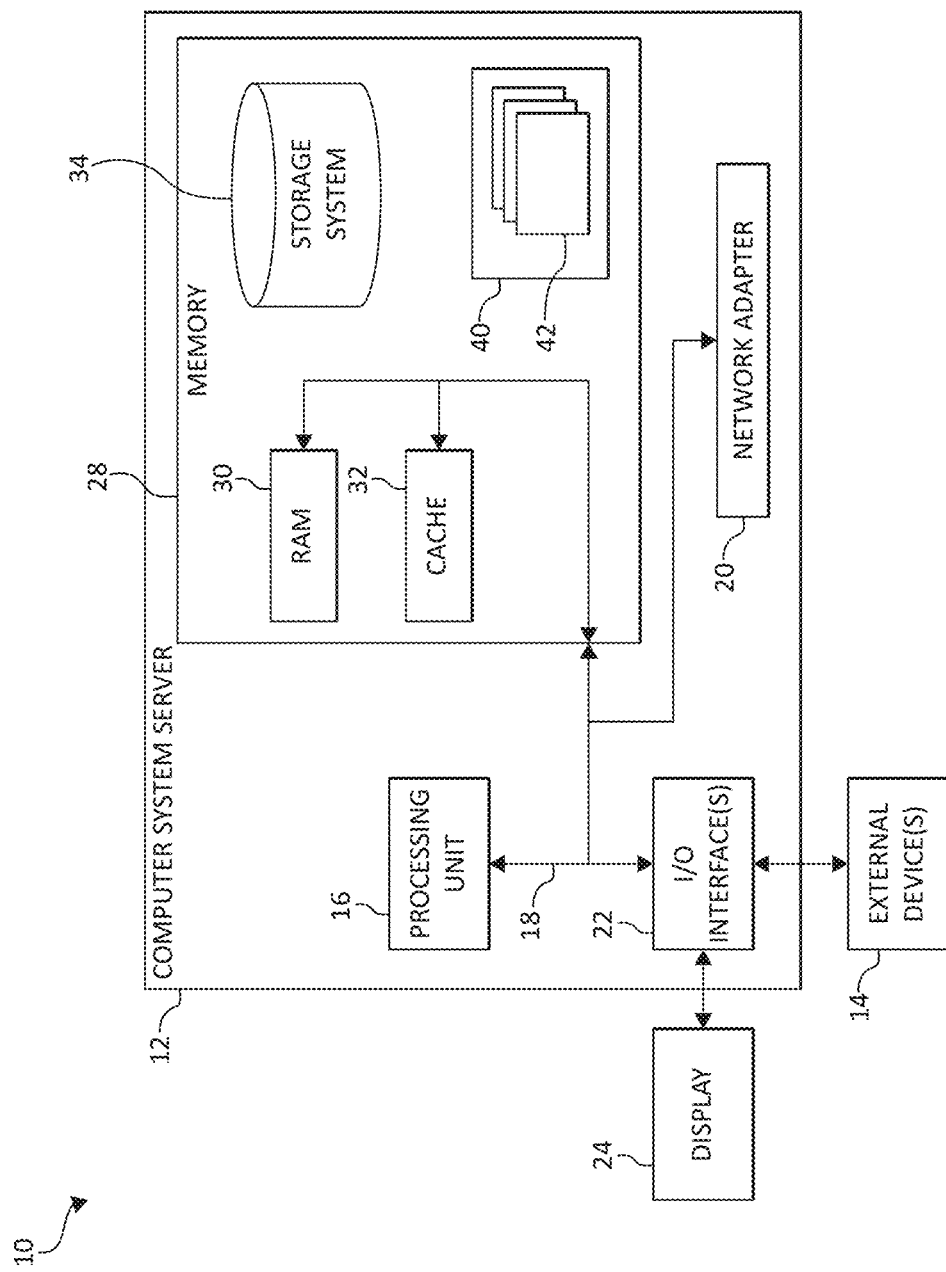
FIG. 1 is a block diagram depicting an exemplary cloud computing node according to an embodiment of the present invention.

Machine learning allows for an automated processing system (a "machine"), such as a computer system or specialized processing circuit, to develop generalizations about particular data sets and use the generalizations to solve associated problems by, for example, classifying new data. Once a machine learns generalizations from (or is trained using) known properties from the input or training data, it can apply the generalizations to future data to predict unknown properties.

In machine learning and cognitive science, neural networks are a family of statistical learning models inspired by the biological neural networks of animals, and in particular the brain. Neural networks can be used to estimate or approximate systems and functions that depend on a large number of inputs and are generally unknown. Neural networks use a class of algorithms based on a concept of inter-connected "neurons." In a typical neural network, neurons have a given activation function that operates on the inputs. By determining proper connection weights (a process also referred to as "training"), a neural network achieves efficient recognition of desired patterns, such as images and characters.

Training the neural network is a computationally intense process such as, for example, training machine learning (ML) models, particularly neural networks for deep learning ("DL"). For example, training process of DL models is iterative. The training code goes over the dataset multiple times (e.g., 10's to 100's of times) so the data is accessed many times potentially in different orders each time.

Training a DL model to reach a desired accuracy involves experimenting with many hyper parameters, and running the training operation many times over the same dataset. When training DL models, it becomes desirable to keep graphical processing unit ("GPU") utilization at approximately 100%. For example, currently, distributed deep learning applications use highly parallel GPU hardware to process large amounts of data and the data has to be quickly read from storage and fed to the GPUs. The success of this approach is based on keeping GPUs busy with data to be processed for almost 100% of the time. However, the performance actually extracted out of each GPU is directly dependent on the input/output ("I/O") bandwidth of the storage solution used to access the dataset. Thus, the storage bandwidth is critical to ensure the GPUs receive data to process at the rate the GPUs can consume the data.

Currently, however, additional challenges are present for training the DL model such as, for example, the GPUs have limited memory, data sets are growing in size, data has to be read from disk and fed to the GPU, and disk bandwidth becomes a bottleneck (as previously stated). Although faster disks such as, for example, Non-Volatile memory express ("NVMe") solves the bandwidth problem, the dataset size often outgrows the size of the NVMes available on a single node.

In one aspect, the dataset may be copied on each node local storage to guarantee the maximum possible I/O bandwidth. However, due to the increasing size of DL datasets, multiple limitations may be experienced such as, for example, sub-optimal utilization of a cluster's resources as a consequence of the placement of training jobs to nodes satisfying both the storage and GPU availability requirement. Additionally, the dataset may be placed in a remote storage (e.g., Cloud Storage, network files system "NFS") that is often unable to sustain the bandwidth required to keep the GPUs busy, reducing the overall performance of the DL jobs.

Moreover, when training DL models in a cloud computing storage environment, the data is received from a cloud storage. The cloud computing storage system provides sufficient space (e.g., large enough space), security, reduced cost, but it is limited in bandwidth. The cloud computing storage and GPU nodes are typically connected over shared, but limited bandwidth network infrastructure (e.g., 10 gigabytes per second ("Gbps"), 25 Gbps, etc.). Thus, application developers need to be able to keep the data in cloud storage, but feed the GPUs at the rate the GPU can consume the data. As such, a GPU Service provider needs to increase the utilization of GPUs by supporting as many users and training jobs as possible. GPU providers can provision dedicated boxes (e.g., bare-metal or virtual machine "VM") and local storage to end users, but such a system is inefficient in both time and cost (e.g., not cost effective for the end user. Also, multiple training jobs accessing data from a remote shared storage results in lower data rates and idle GPU cycles.

For example, application developers use dedicated boxes (e.g., GPU boxes) with a vast number of fast local storage. GPU boxes are connected with high density shared storage, which increases the cost of maintaining the data in the storage. The data is then maintained in cloud computing storage environment and the data is accessed from the GPU nodes as needed. An object-storage plugin is used to make the data available as a portable operation system interface ("POSIX") files. However, the throughput is not sufficient to feed the GPUs. The data is cached on first access and could be cached on local server caches (e.g., operating system buffer cache, or other software block-level least recently used ("LRU") cache technologies for specific remote stores such as, for example, a network file system ("NFLS") Amazon® S3 file system ("S3FS") and a cloud object storage "COS" (e.g., "S3FS/COS") or NFS). That is, current technologies allow to cache data at first access within the memory/storage of individual compute nodes. However, these current technologies have several important/main limitations such as, for example: 1) the visibility of those caches is limited to the node where they reside, 2) the size of those caches is limited to the size of memory/storage dedicated to the purpose on the node where they reside, and/or 3) the caches are not aware of the nature of the data being cached; when the cache is full they will remove file-blocks (usually the least recently used ones) even if there are better choices that (aware of the workload) would yield better performance. However, the cached data is not available for next job. The cached data must fit in the local storage and/or an eviction will throw away the data. Also, job placement is not data locality-aware (e.g., an awareness of location of the data) so the jobs pay a cache penalty each time they start. It should be noted that data locality-aware may mean the job schedule is aware of the subset of nodes that have the dataset content local in their cache (locality-awareness).

Thus, since the cache of the present invention is distributed, a dataset may be cached across a subset of more than one node. Locality benefit is one-off, when it comes to relieving/reducing the cost of the shared storage. That is, if a user is using existing technology, data could be potentially fully cached on each compute node (provided each has enough memory/storage space). If this occurs, one individual job running on those node would already have performance improvements. However, once the job finishes, and given that the scheduler is unaware of the data in the local-caches, other jobs could not benefit from the same cached content because they would most likely be scheduled on different nodes. Moreover, given that existing caches are usually evicted LRU when cache space depletes, it is not guaranteed that at any given moment the desired content would be in the cache. As such, a need exists for a system where the data is accessed once from the shared storage and is kept local and feed into the GPUs at the rate the GPU's can consume the data, which would enable GPU service providers to share GPU resources more efficiently while not impacting the end user training times.

A similar problem occurs in inferencing. In this case, the service provider will have to support many trained DL models (hundreds to thousands), which becomes expensive to keep all DL models cached in memory. Thus, the DL models are stored in a distributed storage such as, for example, a cloud object store. When a request is received, the DL model is pulled from the distributed storage service to the node running the inference engine, which may result in higher than expected latency to serve the first request. As such, some DL models may be more popular than others at different times. Thus, a need also exists for accelerating the load of the DL model and serve the request without retaining the DL memory at all times.

Thus, the present invention provides a method and system able to dynamically create a distributed storage cache on the node's local storage and deploy the training jobs preferably on those nodes, or alternatively on neighboring nodes. The cluster nodes are decoupled from remote storage, thus allowing the infrastructure operator to optimize resources usage and at the same time provide near local storage I/O bandwidth. The present invention accelerates the service and request multiple DL models by retaining the DL models in a cache rather than in a long term data store and/or on the disks of multiple machines.

In one aspect, the present invention provides for caching and data-aware placement for acceleration of machine learning applications in a multi-tenant computing environment. Data may be cached in a distributed data store to one or more local compute nodes of a cluster of nodes. A life cycle of the cached data may be decoupled from a life cycle of a job. A new job may be scheduled, according to cache and data locality awareness, on the one or more local compute nodes with the cached data needed for execution. In one aspect, the cached data may be distributed to the local compute nodes with data but if those nodes are unavailable, the cached data may be scheduled to other nodes in the cluster of nodes.

Also, the present invention provides for simultaneous use by multiple users for caching and data-aware placement for acceleration of machine learning applications in the multi-tenant computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
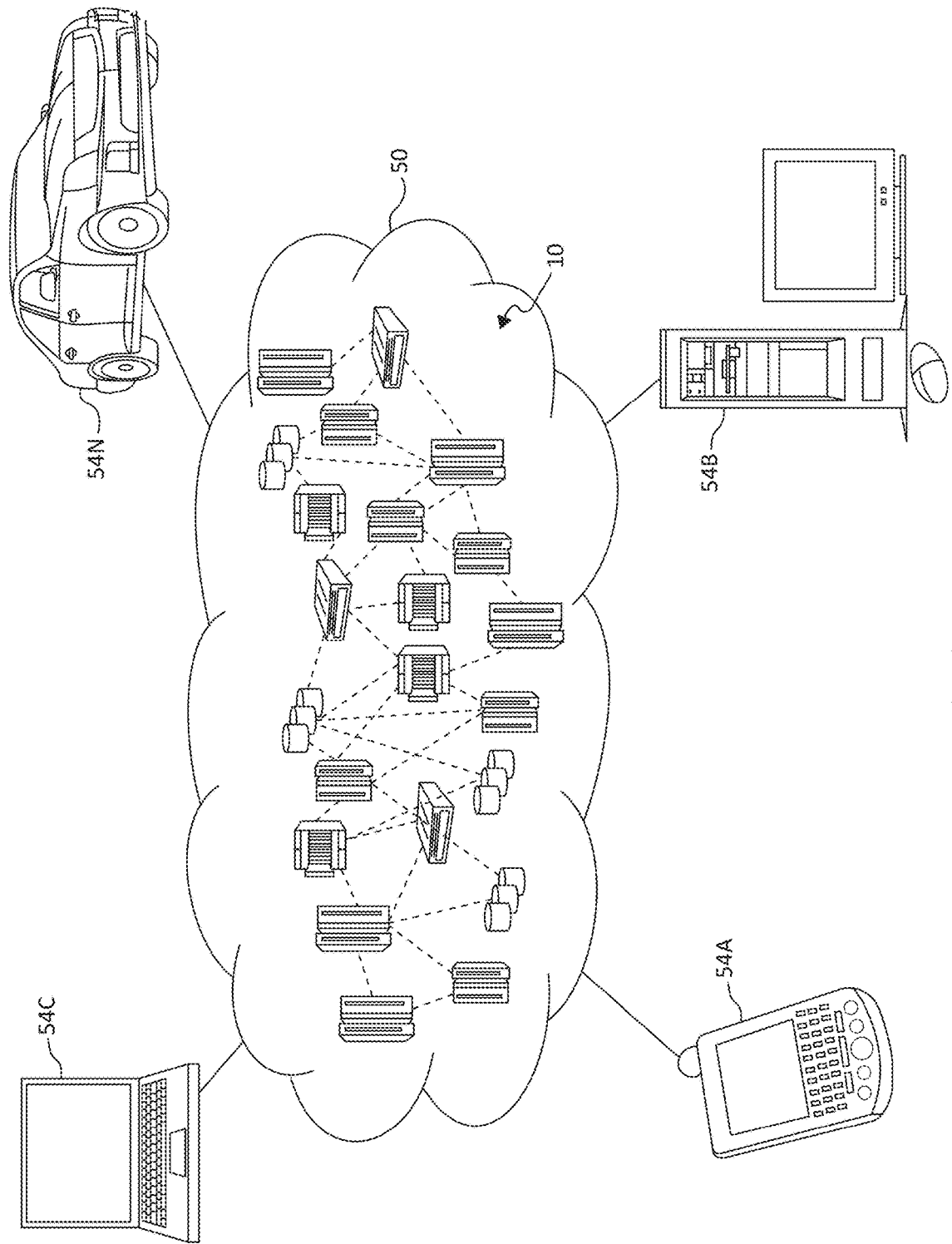
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
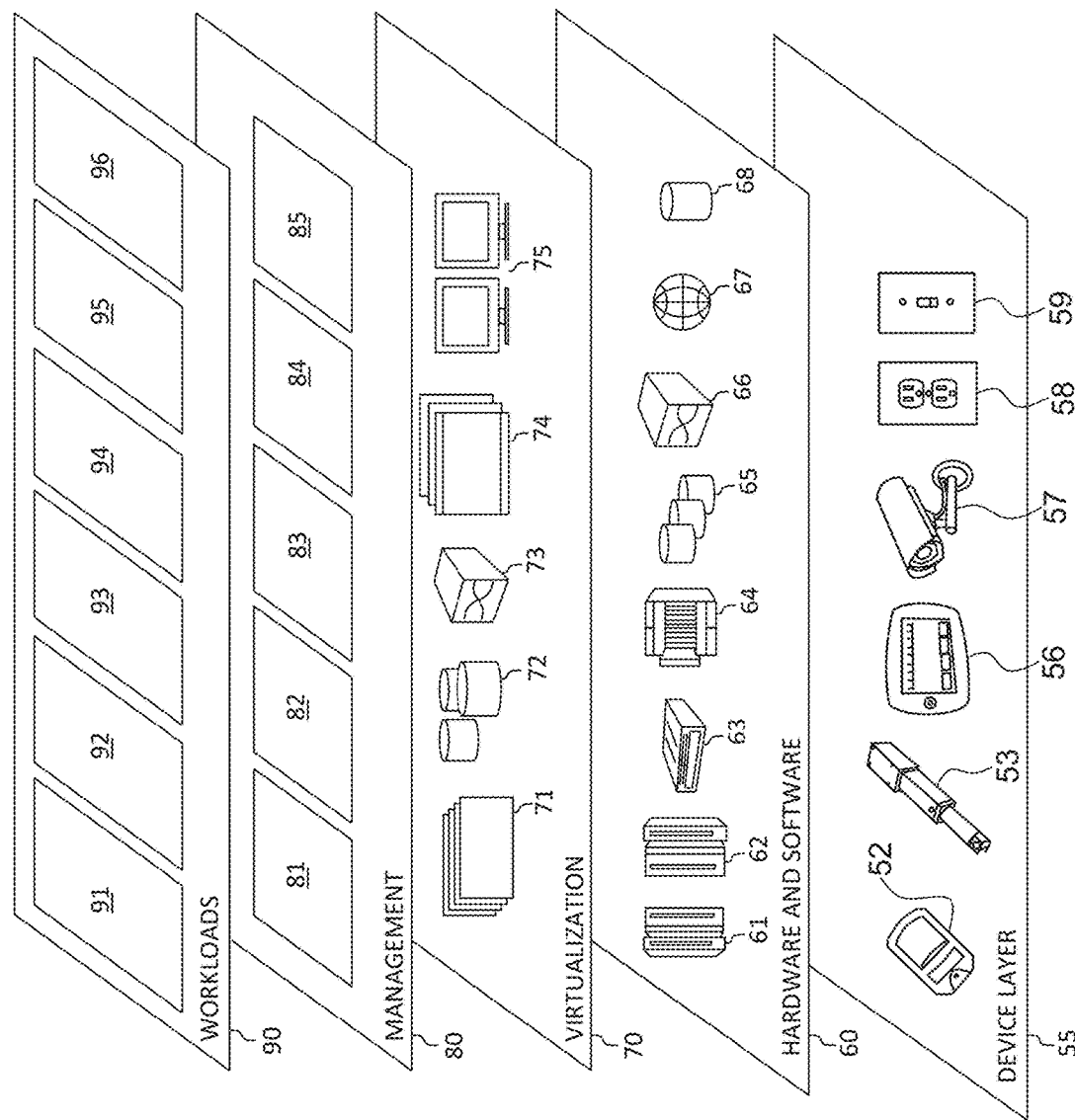
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for caching and data-aware placement for acceleration of machine learning applications. In addition, workloads and functions 96 for caching and data-aware placement for acceleration of machine learning applications may include such operations as data analytics, data analysis, and as will be further described, notification functionality. One with ordinary skill in the art will appreciate that the workloads and functions 96 for caching and data-aware placement for acceleration of machine learning applications may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides for caching and data-aware placement for acceleration of machine learning applications involving deep learning models. That is, the present invention provides a data acceleration system coupling distributed storage caching with coordinated scheduling of data and training DL jobs. The distributed cache may be built on top of the memory and disks locally available on the compute nodes of a system. The distributed cache may be used to feed the GPUs with data providing near local storage I/O bandwidth. While deploying a DL distributed job, a number of nodes may be designated to cache the dataset from remote storage. Training jobs may be deployed preferably on those nodes. From the user perspective this reduces the training/inference time even if data is being sourced from a remote location. From the perspective of the service provider, this allows better utilization of resources as local storage is no longer considered as a strict requirement for the deployment of a job. This is in opposition to the current approach of dedicating a set of nodes to one training job even if not all the computing resources are being used. In addition, cached data can survive the execution of a training/inference and be reused by recurrent jobs (e.g., hyper-parameters tuning) or jobs that share a popular dataset, improving the utilization of the cluster network bandwidth.

Figure 4:
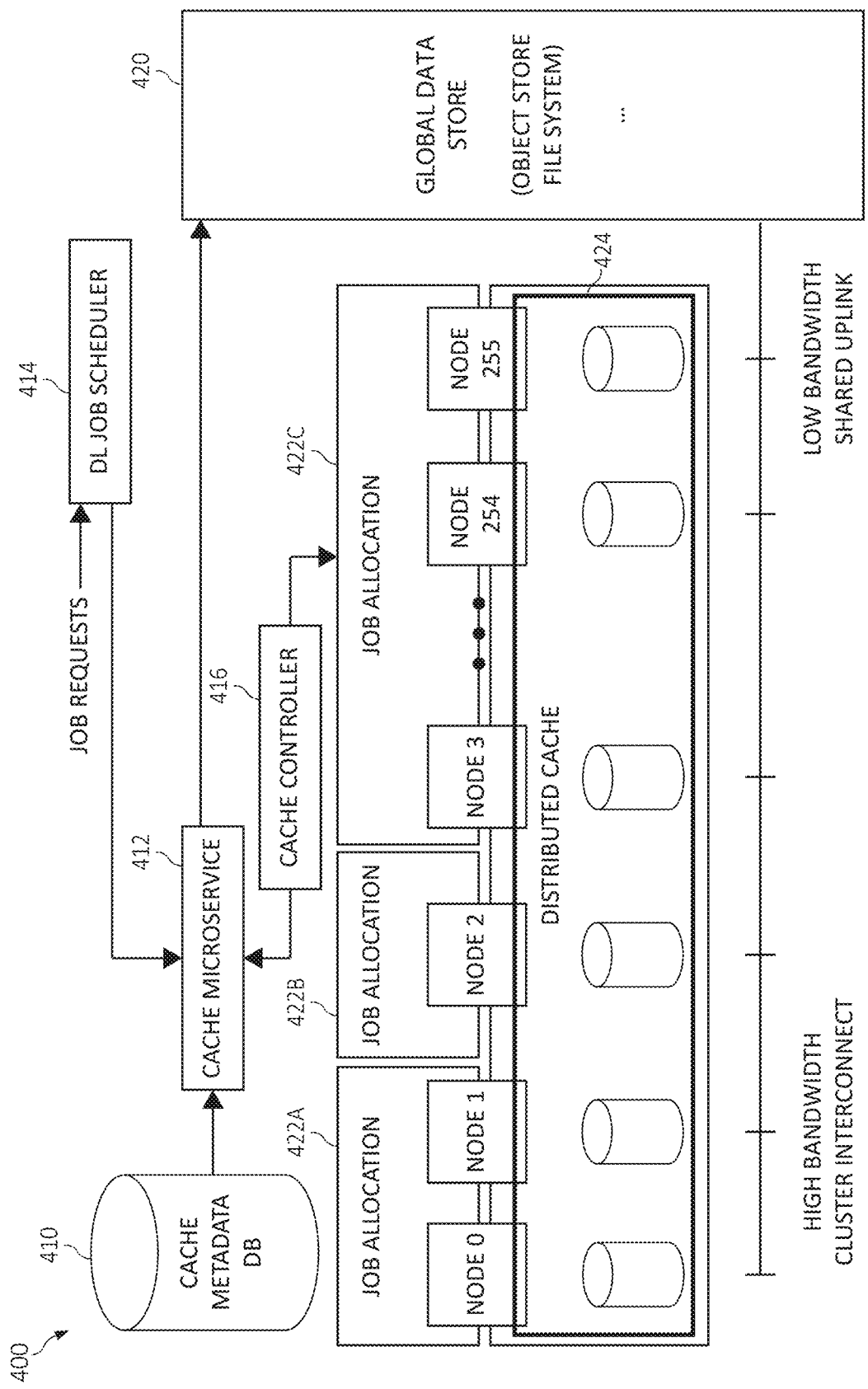
FIG. 4 is an additional block diagram depicting various user hardware and computing components functioning in accordance with aspects of the present invention.

Turning now to FIG. 4, a block diagram depicting exemplary functional components of a computing system 400 according to various mechanisms of the illustrated embodiments is shown. In one aspect, one or more of the components, modules, services, applications, and/or functions described in FIGS. 1-3 may be used in FIG. 4.

The computing system 400 may include a distributed data cache 424, a cluster of nodes such as, for example, compute nodes 0, 1, 3, 4, . . . , 254, and 255, a global ("remote") data store 420 that, depending on the embodiment, may be, for example, an object sore, or a remote file system such as, for example, a network file system ("NFS"), a cache metadata database ("DB") 410, a cache microservice 412, a cache controller 416, and a DL job scheduler 414 (e.g., a cache-aware scheduler). In one aspect, the global data store 420 may be a remotely located store, whose bandwidth is assumed to be insufficient to feed the aggregate GPU bandwidth requirement) such as, for example, a Cloud Object Store (COS), a remote file system (e.g., an NFS), or any other device capable of storing data and has limited bandwidth to the compute nodes.

In one aspect, the computing system 400 is a data acceleration system that couples distributed storage caching using the distributed data cache 424 with coordinated scheduling of data and training DL jobs via the DL job scheduler 414. The distributed data cache 424 may be built on top of the memory and disks locally available on the compute nodes. The distributed data cache 424 may be used to feed the GPUs with data providing near local storage I/O bandwidth. While deploying a DL distributed job, a number of nodes (e.g., nodes 0, 1, 3, 4, . . . , 254, and 255) may be designated to cache a dataset from remote storage.

In operation, one or more job requests may be received by the DL job scheduler 414 (e.g., cache-aware Scheduler). That is, scheduling of DL jobs on the cluster may be managed by a DL job scheduler 414 (e.g., cache-aware Scheduler). Using the cache metadata DB 410, the cache microservice 412, and the cache controller 416, the job requests may be scheduled such as, for example, job applications 422A, 422B, and/or 422C on those compute nodes satisfying the requirements both in terms of resources (e.g., random access memory "RAM") and in terms of data locality.

In cache metadata DB 410 (e.g., a built-in Kubernetes registry), the information (e.g., node placement, size of dataset and whether the datasets are cached or not) about the cached datasets may be maintained/stored. This information is leveraged by the DL job scheduler 414 (e.g., cache-aware scheduler) when making the scheduling decisions.

When caching a new dataset, the cache controller 416 updates the cached-dataset records in the cache metadata DB 410. The cached data in one or more of the nodes (e.g., compute nodes 1, 2, and 3) having the cached data may then be accessible to GPUs on other nodes (e.g., compute node 4) where the data is not cached. A life cycle of the cached data in the distributed data cache 424 may be decoupled from the life cycle of the job. The distributed data cache 424 holds cached data from multiple jobs (which the life cycle jobs may also be decoupled from the lifecycle of the cached data) and multiple users concurrently. The DL job scheduler 414 (e.g., a cache-aware scheduler) is also "cache and data locality aware" so repeated job execution can result in allocating the same nodes with the cached data. The distributed data cache 424 also secures the cached data in the distributed data cache 424. However, upon source data (e.g., the original data) of the cached data being modified/changed, the cached data in the distributed data cache 424 may be invalidated.

More specifically, the relation between the global data store 420 and the distributed data cache 424 is as follows. When a job is submitted for scheduling to the DL job scheduler 414, the cache microservice 412 and the cache controller 416 make decisions on which of the nodes will receive the job allocation. The decision depends on a number of factor such as, for example, job requirements, compute capacity at the nodes (e.g., GPU/CPUs/memory) and storage capacity at the nodes. Depending on the decision, the DL job scheduler 414, the cache microservice 412 can decide to cache the data in the global data store 420 and/or into the distributed cache in the distributed data cache 424 in order to speed up data access. Additionally, the cache microservice 412 can decide to cache the data only on a storage of a subset of the compute nodes such as, for example, the same set of nodes responsible for the job allocation.

Figure 5:
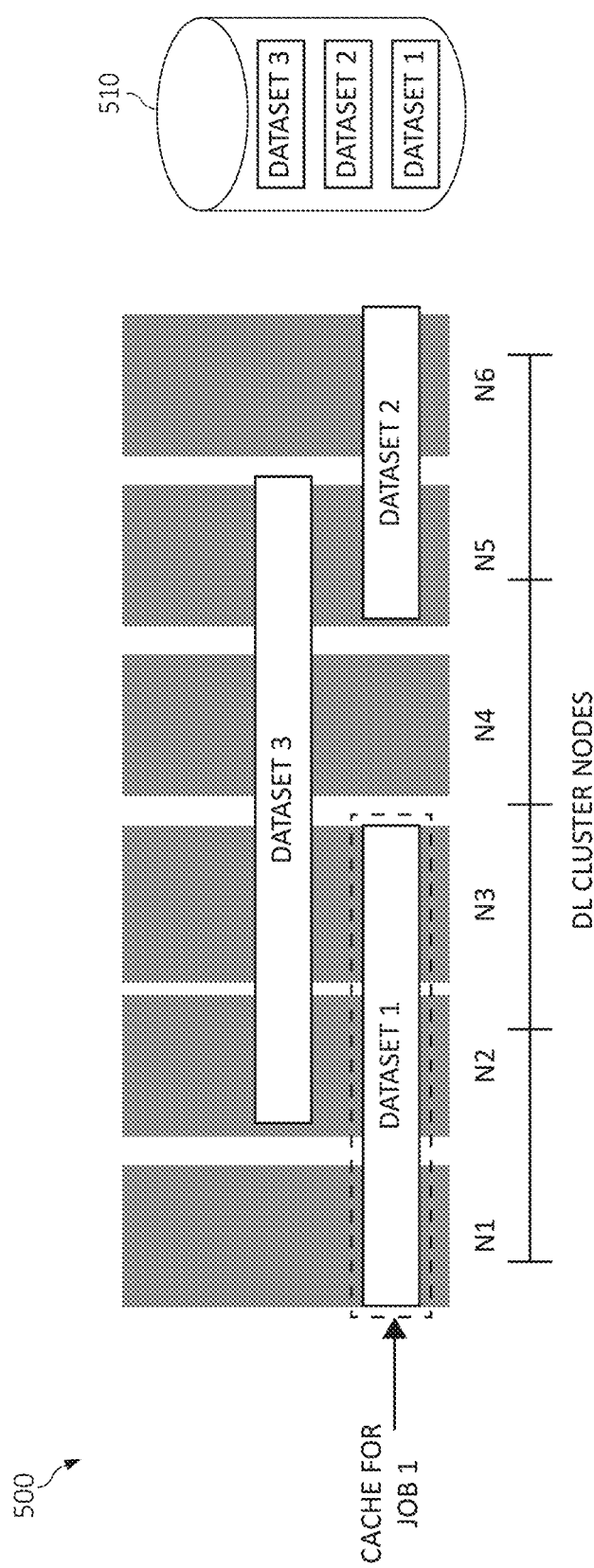
FIG. 5 is an additional diagram depicting data locality execution and scheduling in accordance with aspects of the present invention.

FIG. 5 is a diagram depicting data locality execution and scheduling diagram depicting exemplary functional components of a computing system 500 according to various mechanisms of the illustrated embodiments is shown. In one aspect, one or more of the components, modules, services, applications, and/or functions described in FIGS. 1-4 may be used in FIG. 5.

As illustrated, a cache may be created on a subset of the nodes such as, for example, N1, N2, N3 for dataset 1. A data locality aware operation may be performed for jobs that access dataset 1 such that the jobs may have access to the cached data from N1, N2, N3 regardless of where the jobs are placed in a cluster of nodes rather than from the source data store 510, which may include also include dataset 1, dataset 2, dataset 3.

In an additional aspect, data replication may be employed across one or more nodes to increase aggregate read throughput on cached data that is in high demand. For example, the data locality aware scheduling be performed for jobs that access dataset 1 such that the jobs (e.g., job 1) that access dataset 1 will be favored to run on N1,N2,N3, however, the jobs are not required to run only on those nodes.

Figure 6:
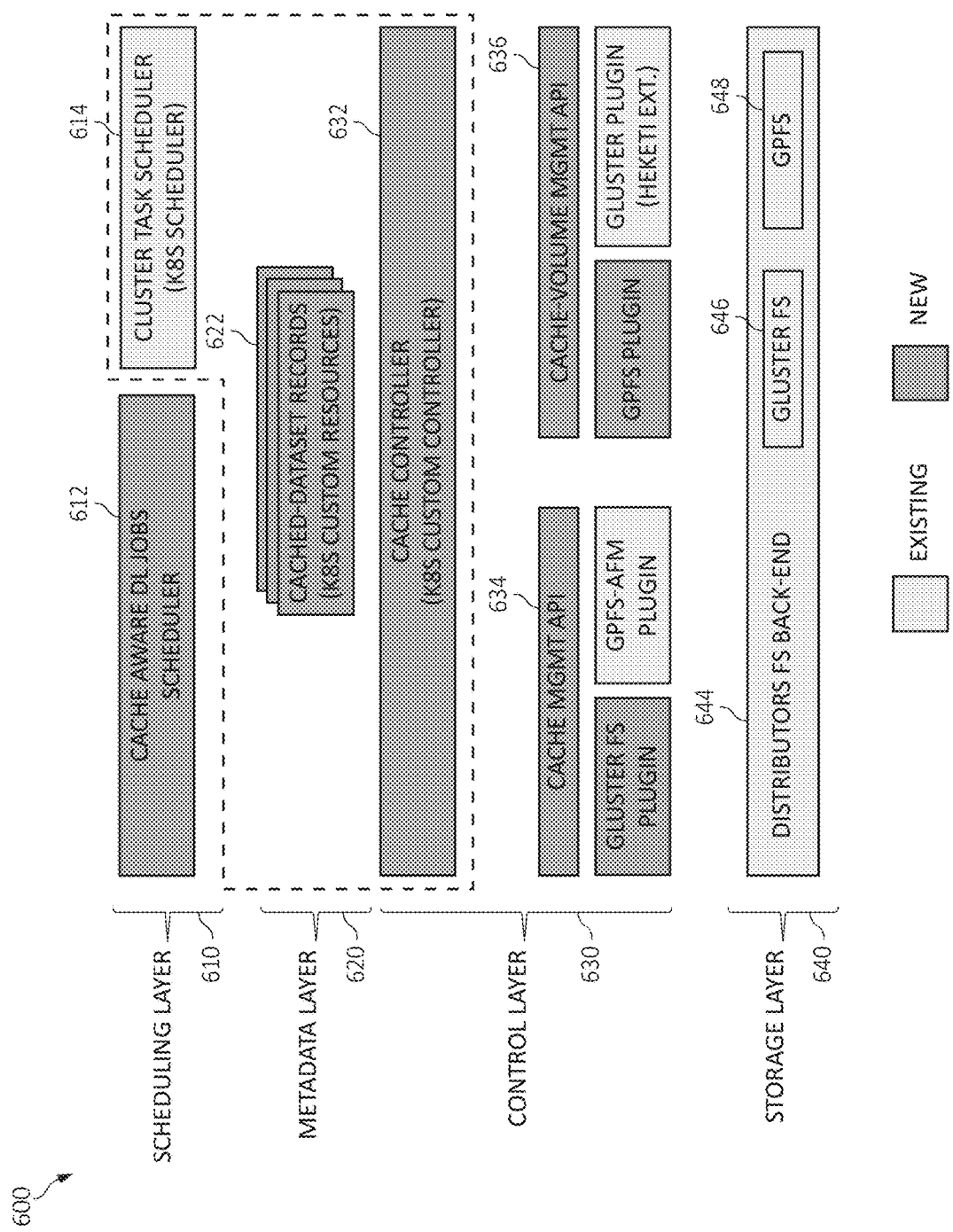
FIG. 6 is an additional block diagram depicting various user hardware and computing components for data caching and data-aware placement for acceleration of machine learning applications in accordance with aspects of the present invention.

Turning now to FIG. 6, a block diagram depicting exemplary functional components of a computing system 600 for data caching and data-aware placement for acceleration of machine learning applications is shown. In one aspect, one or more of the components, modules, services, applications, and/or functions described in FIGS. 1-5 may be used in FIG. 6.

The computing system 600 may include a storage layer 640, a control layer 630, a metadata layer 620, and a scheduling layer 610.

Within the scheduling layer 610, there may be a cache-aware scheduler 612 (e.g., cache-aware DL jobs scheduler), and a cluster task scheduler 614 (e.g., Kubernetes "K8S" scheduler). The scheduling of DL jobs on the cluster is managed by the cache-aware scheduler 612 working alongside with the cluster task scheduler 614 (e.g., a default K8S Scheduler). As a result, a DL job is scheduled on nodes satisfying the requirements both in terms of resources (e.g., CPU, RAM) and in terms of data locality.

The metadata layer 620 may include cached-dataset records 622 (e.g., Kubernetes scheduler "K8S" custom records). In the cached-dataset records 622 (e.g., a built-in Kubernetes registry), information about the cached datasets is maintained such as, for example, node placement, size of dataset and whether or not the data has been cached. This information may be leveraged by the cache-aware scheduler 612 when making the scheduling decisions for a job.

The control layer 630 may include a cache controller 632, a cache management "MGMT" API 634, which may be associated with multiple plugins such as, for example, GlusterFS plugin and a general parallel file system ("GPFS")-AFM plugin, and a cache-volume MGMT API 636, which may be associated with multiple plugins such as, for example, GlusterFS plugin and a Gluster plugin (Heketi ext.). The cache controller 632 updates the cached-dataset records 622 when provisioning persistent volumes for the jobs. Moreover, the cache controller 632 communicates with the cache management "MGMT" API 634 and cache-volume MGMT API 636 to orchestrate a dataset caching on an underlying distributed file system (e.g., on the storage layer 640). It should be noted that various types of plugins can be implemented based on a distributed file system 644, which may be used as the backend.

The storage layer 640 may include a distributed file system 644 (e.g., "distributedFS back-end") having a GlusterFS and GPFS 648. In the storage layer 640, any distributed file system can be used as the backend as long as there is a plugin implementing the necessary management APIs, such as, for example, cache management "MGMT" API 634 and cache-volume MGMT API 636. As an example embodiment, the opensource GlusterFS can be used, as well as IBM® GPFS. ("IBM" is trademark of International Business Machines Corporation).

Figure 7:
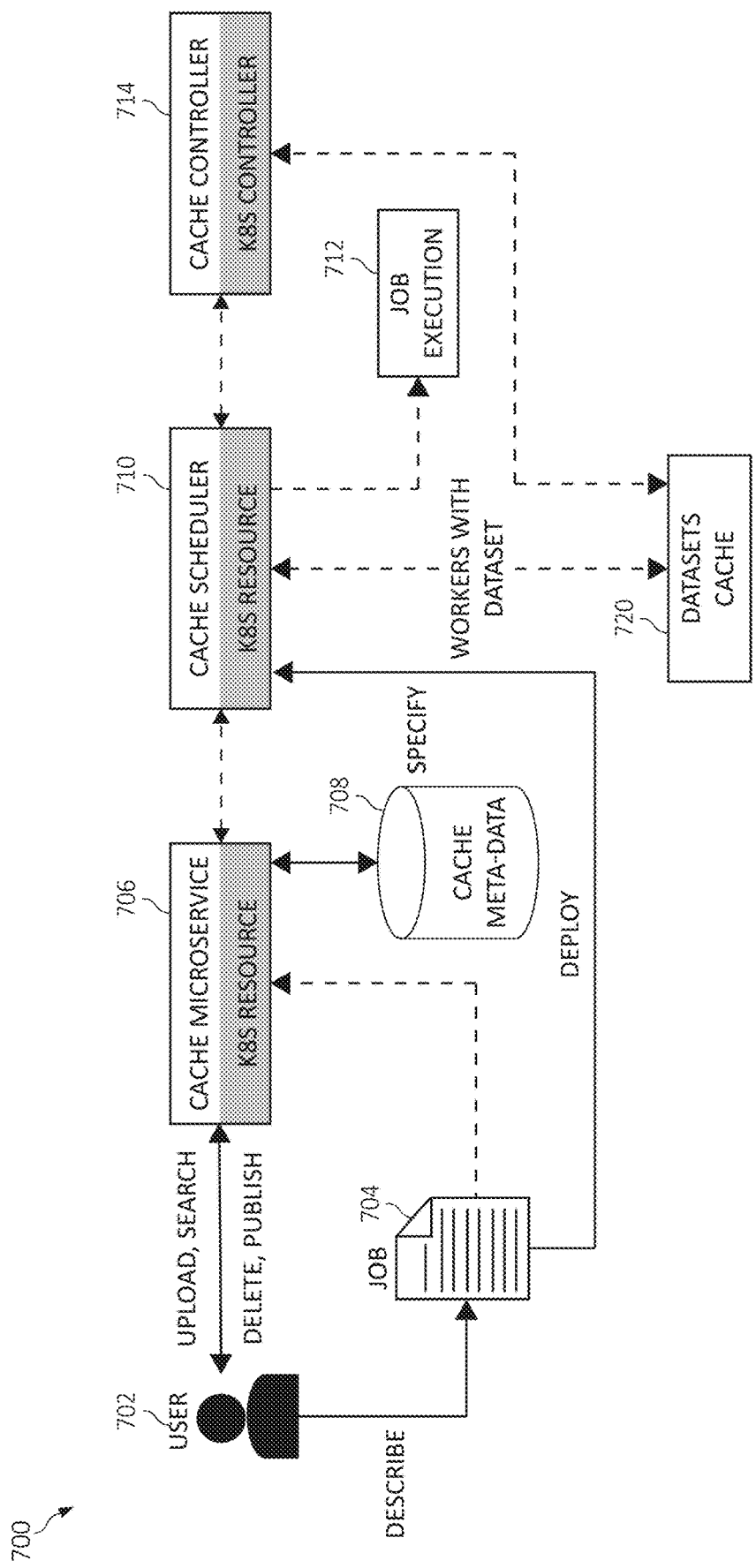
FIG. 7 is a flowchart diagram depicting an exemplary method for data caching and data-aware placement for acceleration of machine learning applications, again in which various aspects of the present invention may be realized.

Turning now to FIG. 7, a block diagram of exemplary functionality 700 relating to data caching and data-aware placement for acceleration of machine learning applications is depicted. As shown, the various blocks of functionality are depicted with arrows designating the blocks' 700 relationships with each other and to show process flow. Additionally, descriptive information is also seen relating each of the functional blocks 700. As will be seen, many of the functional blocks may also be considered "modules" of functionality, in the same descriptive sense as has been previously described in FIGS. 1-6. With the foregoing in mind, the module blocks 700 may also be incorporated into various hardware and software components of a system for image enhancement in accordance with the present invention. Many of the functional blocks 700 may execute as background processes on various components, either in distributed computing components, or on the user device, or elsewhere, and generally unaware to the user.

A user 702 indicates an intention to train a job by describing the job (e.g., a DL job description). The user 702 also specifies to a cache microservice 706 (e.g., k8s Resource) a selected dataset to be used and the location of the dataset for the training. The cache metadata 708 may be used to store and maintain the information (e.g., node placement, size of dataset and whether the datasets are cached or not) about the job.

The dataset may be uploaded into a datastore such as, for example, object store, a file store, etc. The job is deployed with an indication of the selected dataset that is to be used and information about how many nodes the job requires and is received by the cache scheduler 710 (e.g., k8s Scheduler).

The cache scheduler 710 then determines if the data has already been cached in the datasets cache 720. That is, the data is already cached on a given subset of nodes (e.g., workers with dataset), then the cache scheduler 710 may decide to schedule a job on the same set of nodes for achieving cache performance benefits. In the case where data is not cached on any subset of nodes, or where data is cached on some subset of nodes, but those nodes do not have sufficient resources to host the job (e.g., CPUs or GPUs), then the cache scheduler 710 may decide to start caching the data on a different subset of nodes.

Thus, if the dataset is cached in the datasets cache 720, the nodes containing the cached datasets in the datasets cache 720 may be allocated for the job and the job may be executed, as in block 712 ("job execution"). If the nodes do not contain the cached datasets in the datasets cache 720, the cache controller 714 may be initiated to commence brining in the dataset for the job to cache the dataset to the datasets cache 720.

In this way, from the perspective of user 702, minimal changes would be required to leverage the data caching and data-aware placement for acceleration of machine learning applications. On the DL job description, user 702 will only need to add a reference to the dataset indicating the user 702 intends to work with and the operations of the present invention, as described herein, ensure the data access is as fast as possible via caching and smart scheduling.

Figure 8:
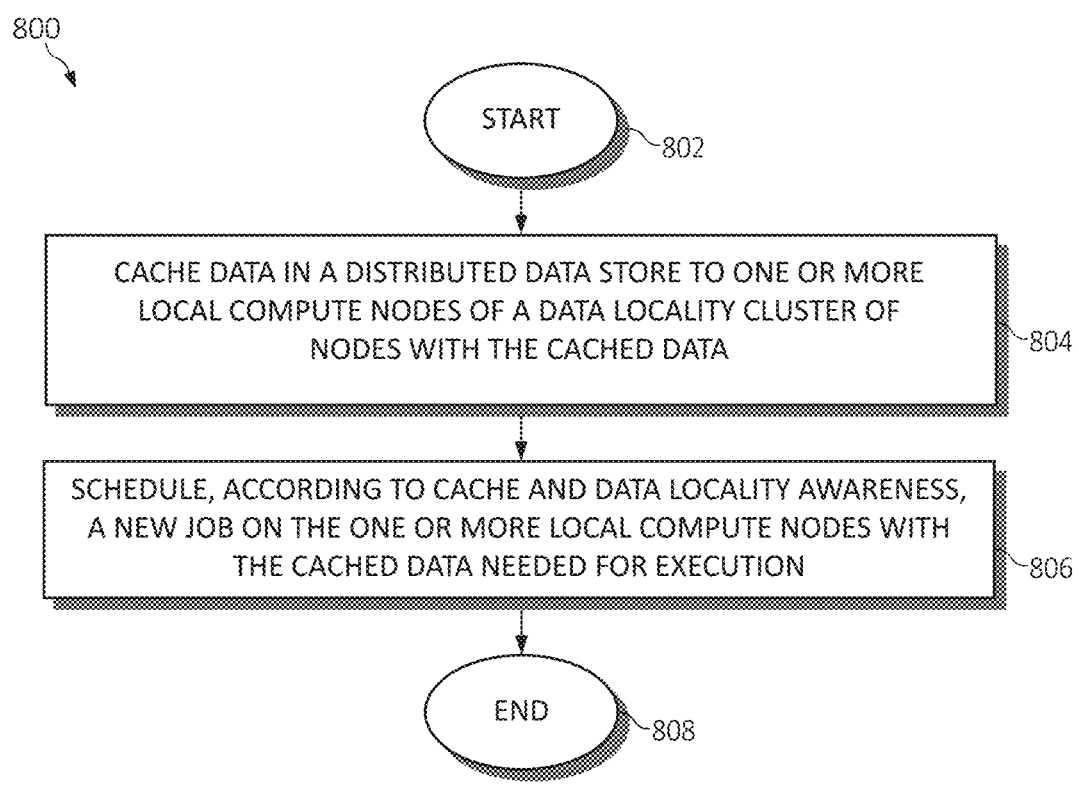
FIG. 8 is an additional flowchart diagram depicting an additional exemplary method for data caching and data-aware placement for acceleration of machine learning applications, again in which various aspects of the present invention may be realized.

FIG. 8 is an additional flowchart diagram 800 depicting an additional exemplary method for data caching and data-aware placement for acceleration of machine learning applications, again in which various aspects of the present invention may be realized. The functionality 800 may be implemented as a method executed as instructions on a machine, where the instructions are included on at least one computer readable medium or one non-transitory machine-readable storage medium. The functionality 800 may start in block 802.

Data may be cached in a distributed data store to one or more local compute nodes of cluster of nodes with the cached data, as in block 804. A new job may be scheduled, according to cache and data locality awareness, on the one or more local compute nodes with the cached data needed for execution, as in block 806. The functionality 800 may end, as in block 808.

In one aspect, in conjunction with and/or as part of at least one block of FIG. 8, the operations of method 800 may include each of the following. The operations of method 800 may decouple a life cycle of the cached data from a life cycle of a job. The operations of method 800 may access to the cached data to one or more graphical processing unit ("GPU") located on alternative nodes. The operations of method 800 may concurrently hold in the one or more local nodes the cached data and addition cached data from a plurality of jobs and users. The cached dataset may be invalidated upon a modification to source data. The operations of method 800 may manage each decision for scheduling of each new job using a cache-aware scheduler, maintain a plurality of information of the cached data, wherein the plurality of information includes a node placement, size of the cached data, and location of the cached data, and/or leverage the plurality of information by a cache-aware scheduler for determining the scheduling of the new job to one or more local compute nodes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for data caching and data-aware placement for machine learning by a processor in a multi-tenant computing environment, comprising:
    caching data in a distributed data store to one or more local compute nodes of a cluster of nodes, the distributed data store comprising a distributed cache shared between and accessible locally to each of the one or more local compute nodes;
    scheduling, according to cache and data locality awareness, a new deep learning job on the one or more local compute nodes with the cached data needed for execution; wherein, commensurate with scheduling the new deep learning job, the cached data needed for execution is transferred from a remotely located cloud-based object storage to a plurality of designated nodes in the cluster maintaining the distributed cache of the one or more local compute nodes prior to commencing execution of the new deep learning job;
    maintaining a plurality of information of the cached data, wherein the plurality of information includes a node placement, a size of the cached data, and a location of the cached data; and
    leveraging the plurality of information by a cache-aware scheduler for determining the scheduling of the new deep learning job to the one or more local compute nodes.

2. The method of claim 1, further including providing access to the cached data to one or more graphical processing unit ("GPU") located on alternative nodes.

3. The method of claim 1, further including decoupling a life cycle of the cached data from a life cycle of a job.

4. The method of claim 1, further including concurrently holding in the one or more local nodes the cached data and additional cached data from a plurality of jobs and users.

5. The method of claim 1, further including managing each decision for scheduling of each new job using the cache-aware scheduler.

6. The method of claim 1, further including invalidating the cached dataset upon a modification to source data.

7. A system for data caching and data-aware placement for machine learning by a processor in a multi-tenant computing environment, comprising:
    one or more computers with executable instructions that when executed cause the system to:
        cache data in a distributed data store to one or more local compute nodes of a cluster of nodes, the distributed data store comprising a distributed cache shared between and accessible locally to each of the one or more local compute nodes;
        schedule, according to cache and data locality awareness, a new deep learning job on the one or more local compute nodes with the cached data needed for execution; wherein, commensurate with scheduling the new deep learning job, the cached data needed for execution is transferred from a remotely located cloud-based object storage to a plurality of designated nodes in the cluster maintaining the distributed cache of the one or more local compute nodes prior to commencing execution of the new deep learning job;
        maintain a plurality of information of the cached data, wherein the plurality of information includes a node placement, a size of the cached data, and a location of the cached data; and
        leverage the plurality of information by a cache-aware scheduler for determining the scheduling of the new deep learning job to the one or more local compute nodes.

8. The system of claim 7, wherein the executable instructions further provide access to the cached data to one or more graphical processing unit ("GPU") located on alternative nodes.

9. The system of claim 7, wherein the executable instructions further decouple a life cycle of the cached data from a life cycle of a job.

10. The system of claim 7, wherein the executable instructions further concurrently hold in the one or more local nodes the cached data and additional cached data from a plurality of jobs and users.

11. The system of claim 7, wherein the executable instructions further manage each decision for scheduling of each new job using the cache-aware scheduler.

12. The system of claim 7, wherein the executable instructions further invalidate the cached dataset upon a modification to source data.

13. A computer program product for data caching and data-aware placement for machine learning by a processor in a multi-tenant computing environment, the computer program product comprising a non-transitory computer-readable storage medium having computer-readable program code portions stored therein, the computer-readable program code portions comprising:

an executable portion that caches data in a distributed data store to one or more local compute nodes of a cluster of nodes, the distributed data store comprising a distributed cache shared between and accessible locally to each of the one or more local compute nodes; and an executable portion that schedules, according to cache and data locality awareness, a new deep learning job on the one or more local compute nodes with the cached data needed for execution; wherein, commensurate with scheduling the new deep learning job, the cached data needed for execution is transferred from a remotely located cloud-based object storage to a plurality of designated nodes in the cluster maintaining the distributed cache of the one or more local compute nodes prior to commencing execution of the new deep learning job;

an executable portion that maintains a plurality of information of the cached data, wherein the plurality of information includes a node placement, a size of the cached data, and a location of the cached data; and an executable portion that leverages the plurality of information by a cache-aware scheduler for determining the scheduling of the new deep learning job to the one or more local compute nodes.

14. The computer program product of claim 13, further including an executable portion that provides access to the cached data to one or more graphical processing unit ("GPU") located on alternative nodes.

15. The computer program product of claim 14, further including an executable portion that decouples a life cycle of the cached data from a life cycle of a job.

16. The computer program product of claim 14, further including an executable portion that concurrently holds in the one or more local nodes the cached data and additional cached data from a plurality of jobs and users.

17. The computer program product of claim 14, further including an executable portion that
manages each decision for scheduling of each new job using the cache-aware scheduler.

18. The computer program product of claim 14, further including an executable portion that invalidates the cached dataset upon a modification to source data.

\* \* \* \* \*